United States Patent Office 3,147,230
Patented Sept. 1, 1964

3,147,230
OLEFIN COPOLYMERIZATION CATALYST
Edward Karcher Gladding, New Castle, Del., assignor to
E. I. du Pont de Nemours and Company, Wilmington,
Del., a corporation of Delaware
No Drawing. Filed June 9, 1960, Ser. No. 34,875
3 Claims. (Cl. 252—429)

This invention is directed to a new olefin copolymerization catalyst prepared in the absence of monomers to be polymerized, which catalyst has improved solubility in saturated hydrocarbon solvents. The amorphous copolymers prepared with this novel catalyst can be vulcanized to yield elastomers displaying unusually good resistance toward oxygen, ozone, and heat.

Copolymers for use as elastomers should be as amorphous as possible in the unstretched state. It is known that amorphous high molecular weight copolymers of ethylene and alpha olefins can be prepared in saturated hydrocarbon solvents in the presence of a soluble coordination catalyst. On the other hand, if the catalyst is present in a separate phase as an insoluble solid during the reaction, the resulting copolymers exhibit crystallinity even when unstressed. Higher molecular weight aluminum trialkyls such as aluminum trihexyl and aluminum trioctyl, which react with vanadium oxytrichloride in hydrocarbon solvents to form soluble catalysts, are not commercially available. Aluminum triisobutyl, which is available, reacts with vanadium oxytrichloride in hydrocarbon solvents to form an unstable colloidal suspension from which a solid precipitates. It is known that aluminum triisobutyl undergoes an exchange reaction with alpha olefins having the formula R—CH=CH$_2$, where R is an alkyl radical having at least 4 carbon atoms, to liberate isobutylene and form aluminum trialkyls having the formula AlR'$_3$, where R' is an alkyl radical having at least 6 carbon atoms. However, it is inconvenient and economically undesirable to carry out this added exchange reaction in order to obtain the higher molecular weight aluminum trialkyls needed for preparing amorphous copolymers.

It is, therefore, an object of the present invention to provide a new polymerization catalyst for making amorphous high molecular weight hydrocarbon copolymers. It is a further object of this invention to prepare amorphous copolymers which can be vulcanized with said catalyst to provide elastomers having significantly superior resistance toward oxygen, ozone, and heat. These and other objects will appear hereinafter.

More specifically, the present invention is directed to a polymerization catalyst prepared by contacting aluminum triisobutyl with from about 0.1 to 3 molar equivalents of vanadyl chloride or vanadium tetrachloride in the presence of at least 3 molar equivalents of an alpha olefin having the structure CH$_2$=CH—R, wherein R is an alkyl radical having 4 to 6 carbon atoms, in a saturated hydrocarbon solvent at a temperature below about 90° C., other olefins polymerizable by this catalyst being absent during its formation.

The catalysts of this invention are formed by mixing aluminum triisobutyl with selected vanadium salts in the presence of at least one alpha monoolefin having 6 to 18 carbon atoms, in specified molar proportions, in a saturated hydrocarbon solvent at temperatures up to about 90° C. The long-chain alpha monoolefin should be present when the aluminum triisobutyl and the vanadium salt are mixed; otherwise, a precipitate forms which is not dissolved by the subsequent addition of the long-chain alpha monoolefin. Either the aluminum triisobutyl or the vanadium salt can be mixed first with the long-chain alpha monoolefin; if desired, the aluminum triisobutyl, the vanadium salt, and the long-chain alpha monoolefin can be simultaneously mixed together in the hydrocarbon solvent.

Ethylene and mixtures of ethylene with propylene or mixtures of ethylene, propylene and 1,4-hexadiene are representative examples of the polymerizable monomers which should be absent during the formation of the catalyst of this invention.

The components are stirred until the reaction mixture is free from visible solid matter. Reaction temperatures range between about 90° C. and the freezing point of the mixture; above 90° C. there is a tendency for the catalyst to decompose. The catalyst is stable toward precipitation. When the catalyst is newly formed it displays its maximum activity in promoting the copolymerization of ethylene and alpha monoolefins. The catalyst can be stored for days at room temperature or below. The effective catalyst life tends to decrease as the storage temperature is raised. Those skilled in the art can readily determine the allowable storage time for a particular catalyst.

About 0.1 mole to 3 moles of the vanadium salt is supplied for every mole of the aluminum triisobutyl. There is usually no advantage gained by using less vanadium salt than indicated above; the copolymerization reaction rate tends to be lower when the catalyst is used; the resulting copolymer product is less easy to process because of its higher Mooney viscosity. The catalyst appears to display a lower degree of activity when more than 3 moles of the vanadium salt is used in its preparation.

At least 3 moles of the long-chain alpha monoolefin is provided for every mole of the aluminum triisobutyl. If less alpha monoolefin is available, the resulting catalyst will be less soluble in hydrocarbon solvents and will, consequently, tend to produce a copolymer having some crystallinity. There is generally no advantage in supplying much more than 3 moles.

Representative examples of long-chain alpha monoolefins which may be reacted with aluminum triisobutyl to make the catalyst of the present invention include: 1-hexane; 4-methyl-1-pentene; 1-heptene; 4-methyl-1-hexene; 5-methyl-1-hexene; 4,4-dimethyl-1-pentene; 6-methyl-1-heptene; 1-octene; 4-methyl-1-heptene; 5-methyl-1-heptene; 6-methyl-1-heptene; 1-nonene; 1-decene; 4,4-dimethyl-1-hexene; 1-undecene; 5,6,6-trimethyl-1-heptene; 4 - methyl - 1 - decene; 1 - dodecene; 1 - tridecene; 1 - tetradecene; 1 - pentadecene; 1 - hexadecene; and, 1 - octadecene.

Any saturated liquid hydrocarbon solvent can be employed. Representative examples include: neopentane; isopentane; pentane; cyclopentane; n-hexane; cyclohexane; n-heptane; 2,2,4-trimethylpentane; methylcyclohexane; n-octane; n-nonane; n-decane; and n-dodecane. Cyclohexane is preferred. The maximum concentration of catalyst prepared in the inert hydrocarbon solvent will vary a little depending upon the nature of the C$_{6-18}$ olefin and the vanadium salt. Those skilled in the art can readily determine the value for a particular catalyst combination. The catalyst concentration in the copolymerization reactor itself is often about 0.005 to 0.0005 molar, although higher or lower concentrations can often be used.

The catalyst can be prepared in any reaction vessel which is inert to the reactants and solvent. Glass, glass-enamel, or stainless steel are satisfactory. The reactor is preferably equipped with means for agitation and cooling.

The present catalyst is useful for reacting ethylene with alpha monoolefins having the structure

wherein R' is a C$_1$–C$_8$ alkyl radical, in a saturated aliphatic hydrocarbon solvent to form amorphous normally solid high molecular weight copolymers. Alpha monoolefins having the structure R—CH$_2$—CH=CH$_2$, where R is a C$_1$–C$_7$ alkyl radical, are particularly useful for making elastomers. Representative examples of these monoolefins include: propylene, which is preferred; 1-butene; 1-octene; 5,5-dimethyl-1-octene; 5-methyl-1-nonene; and 1-decene. Representative examples of mixtures which can be copolymerized include: ethylene/propylene; ethylene/1-butene; ethylene/1-pentene/1-octene; ethylene / 1-butene / 1-heptene; ethylene / propylene / 1-decene.

The amorphous high molecular weight copolymers which may be prepared in saturated aliphatic hydrocarbon solvents by the catalyst of this invention also include copolymers of ethylene, an alpha olefin and non-conjugated dienes. The alpha olefins may be represented by the formula R'—CH=CH$_2$ wherein R' is an alkyl radical of up to about eight carbon atoms. A representative class of non-conjugated dienes may be represented by the formula

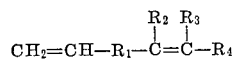

wherein R$_1$ is an alkylene radical, R$_2$ and R$_3$ are independently selected from the group consisting of hydrogen and alkyl radicals and R$_4$ is an alkyl radical, wherein R$_1$ to R$_4$ are so selected that the dienes have from about 6 to 22 carbon atoms. Representative examples of the alpha olefins are propylene; 1-butene; 1-hexene; 1-decene; 4-methyl-1-pentene; 1-heptene; 4-methyl-1-hexene; 5-methyl-1-hexene; 4,4-dimethyl-1-pentene; 6-methyl-1-heptene; 4-methyl-1-heptene; 5-methyl-1-heptene; 4,4-dimethyl-1-hexene; and 5,6,6-trimethyl-1-heptene. Representative examples of the dienes are 1,4-hexadiene, which is preferred; 1,9 - octadecadiene; 6 - methyl - 1,5 - heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; 15-ethyl-1,15-heptadecadiene. Representative examples of mixtures which can be copolymerized include ethylene/propylene/1,4-hexadiene, which is preferred; ethylene / 1-butene / 1,4-hexadiene / 11-ethyl-1,11-tridecadiene; ethylene / 1-butene / 1-octene / 6-methyl-1,5-heptadiene; and ethylene/1-pentene/1,4-hexadiene/1,9-octadecadiene. These copolymers contain ethylenic unsaturation corresponding to an iodine number of at least 3 and preferably not more than 50, and have intrinsic viscosities in tetrachloroethylene at 30° C. of 1.0 to 10 (corresponding to viscosity-average molecular weights of about 30,000 and 70,000, respectively). There are present in the copolymer about 0.1 to 2.5 gram-moles, preferably 0.1 to 1.0 gram-mole, of diene units per kilogram of copolymer.

In making copolymers, a solution of the appropriate monomers is contacted in an inert hydrocarbon solvent at —20 to 90° C. at atmospheric or superatmospheric pressure with the preformed subject catalyst.

During the run, monomers can be introduced, separately or in admixture, at a rate equal to or in excess of the rate at which polymer is formed. More catalyst may be introduced continually or intermittently. The copolymer formed can be isolated by reactivating the catalyst with alcohol, extracting the copolymer solution with aqueous mineral acid to remove vanadium and aluminum salts, washing the solution acid-free, and evaporating the hydrocarbon solvent. A non-volatile antioxidant, such as 2,2'-methylenebis(6-tert-butyl-4-methylphenol) or 4,4'-thiobis(6-tert-butyl-3-methylphenol), is incorporated prior to the final isolation step to avoid possible oxidation and degradation of the copolymer.

In operating this copolymerization process care should be taken to exclude all traces of moisture and oxygen since they tend to poison the catalyst. A protective atmosphere of an inert gas such as argon or nitrogen is often supplied prior to the introduction of the gaseous monomer feed stream. Monomer gases can be purified by passing them successively through columns of silica gel, scrubbers containing triisobutyl aluminum, and a column of silica gel connected to the inlet tube of the reaction vessel.

Any material which is inert to the reactants, catalyst, and solvent is suitable for the copolymerization reaction vessel. Glass, glass-enamel, or stainless steel are satisfactory. The reactor should be equipped with means for agitation and cooling. There should be a monomer gas inlet tube having an opening below the liquid surface of the reaction mixture. The gas outlet tube should be protected from inflow of outside air by suitable traps.

The following representative examples illustrate the present invention.

Example 1

A one-liter glass resin flask was equipped with a gas inlet tube, a gas outlet tube, a "Tru-bore" stirrer having a glass paddle, a thermometer, a syringe inlet fitted with a rubber serum cap, and a 100-ml. pressure-equalized glass dropping funnel containing a magnetic stirring bar and sealed with a rubber serum cap. After the apparatus had been flame-dried under a nitrogen sweep, it was immersed in a constant temperature bath maintained at 30° C.

One liter of cyclohexane was introduced into the resin flask and sparged with nitrogen to remove air. A 50-ml. portion was then removed by forcing it upward, by nitrogen pressure, into the dropping funnel through the stem which projected below the liquid surface. The stop-cock on the funnel was then closed.

The catalyst was prepared in this funnel by introducing, from nitrogen-flushed pipettes, 0.60 milliliter (0.0025 mole) of aluminum triisobutyl, 1.2 milliliters (0.0075 mole) of 1-octene, and 0.20 milliliter (0.0019 mole) of vanadium oxytrichloride into the dropping funnel while agitation therein was maintained by the magnetic bar. An opaque-violet catalyst solution formed and stirring was continued for 30 minutes at 30° C.

During this time a gas mixture supplying ethylene at the rate of 200 cc./min. and propylene at the rate of 700 cc./min. was metered through calibrated rotameters, then freed from moisture and oxygen by passage through aluminum triisobutyl scrubbing towers, and finally introduced into the resin flask at a point below the surface of the cyclohexane which thereafter became saturated with each monomer.

Then the catalyst solution was dropped into the saturated monomer solution where it formed a clear violet solution. A slight temperature rise occurred and the monomers were absorbed at the input rate. After 37 minutes, the flow of ethylene and propylene was stopped and one liter of butanol was introduced to deactivate the catalyst and precipitate the copolymer. 5.7 grams of a completely amorphous (as determined by X-ray diffraction) rubbery solid was obtained which contained 68 mole percent propylene monomer units and exhibited an inherent viscosity of 2.41 (0.1% solution in tetrachloroethylene at 30° C.).

Example 2

The procedures of Example 1 for the catalyst preparation and the copolymerization were repeated except that: ethylene and propylene were fed at the rates of 400 cc./min. and 1500 cc./min., respectively; the catalyst was used 10 minutes after it had been prepared. Thirty minutes after the copolymerization had been initiated, the flow of ethylene and propylene was stopped and 5 cc. of butanol was added to the reaction mixture to deactivate the catalyst. The reaction mixture was then washed, in turn, with 500 cc. of 2% hydrochloric acid, and three separate volumes of water. Concentration of the copolymer solution by drum drying gave 14.8 grams of a smooth elastomer containing 62 weight percent propylene. This elastomer was free of crystallinity as measured by X-ray diffraction, exhibited an inherent viscosity (0.1 gram copolymer in 100 grams of tetrachloroethylene at 30° C.) of 2.5, and processed well on a rubber roll mill. One hundred parts (by weight) of this copolymer was compounded on a mill with 50 parts of super abrasion furnace black, 1.0 part of a mixture containing 33% by weight N-4-dinitroso-N-methyl aniline and 67% clay, and 7 parts of a mixture containing 40% by weight dicumyl peroxide and 60% calcium carbonate. The stock obtained was cured at 160° C. for 60 minutes to give a rubbery vulcanizate displaying the following properties at 25° C.: modulus at 300% extension,[1] 1200 p.s.i.; tensile strength [1] 2250 p.s.i.; extension at the break,[1] 420%; Yerzley resilience [2] 49%.

Any of the heretofore described alpha olefins together with any of the described catalysts may be substituted in the preceding examples to give substantially the same results. Also any of the described liquid hydrocarbon solvents may be substituted for the solvent of the preceding examples to give essentially the same results. Other variations as to specific reaction conditions may be varied within the skill of the art.

---

[1] Measured in accordance with the procedure given in the article Composite Nature of the Stress-Strain Curve of Rubber by I. Williams and B. M. Sturgis, Industrial and Engineering Chemistry, vol. 31, p. 1303 (19939).
[2] Measured in accordance with ASTM Procedure D945-55.

The embodiments of the invention in which an exclusive property or privilege is claimed are defined as follows:

1. A catalyst useful in the preparation of amorphous olefin copolymers, said catalyst prepared by contacting aluminum triisobutyl with from about 0.1 to 3 molar equivalents of a compound selected from the groups consisting of vanadyl chloride and vanadium tetrachloride in the presence of an amount of an alpha olefin having the structure $CH_2=CH-R_1$ wherein R is an alkyl radical having 4 to 16 carbon atoms sufficient to provide 3 moles of said olefin for every mole of aluminum triisobutyl, said catalyst being prepared in a saturated hydrocarbon solvent at a temperature below about 90° C., and said catalyst being soluble in said saturated hydrocarbon solvent; other olefins polymerizable by this catalyst being absent during the formation of said catalyst.

2. A catalyst as defined in claim 1 wherein said alpha olefin is 1-octene.

3. A catalyst as defined in claim 1 wherein said solvent is cyclohexane.

References Cited in the file of this patent

UNITED STATES PATENTS

| | | |
|---|---|---|
| 2,962,451 | Schreyer | Nov. 29, 1960 |
| 2,977,350 | Fasce et al. | Mar. 28, 1961 |